(12) United States Patent
Zettner (10) Patent No.: US 9,858,565 B1
(45) Date of Patent: *Jan. 2, 2018

(54) GPS VALIDATION FOR TRANSACTIONS

(71) Applicant: United Services Automobile Association (USAA), San Antonio, TX (US)

(72) Inventor: Steven Dale Zettner, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 652 days.

This patent is subject to a terminal disclaimer.

(21) Appl. No.: 14/472,704

(22) Filed: Aug. 29, 2014

Related U.S. Application Data (63) Continuation of application No. 11/590,996, filed on Oct. 31, 2006, now Pat. No. 8,825,073.

(51) Int. Cl.
*H04W 24/00* (2009.01)
*G06Q 20/32* (2012.01)
*G06Q 20/38* (2012.01)

(52) U.S. Cl.
CPC ....... *G06Q 20/3224* (2013.01); *G06Q 20/382* (2013.01)

(58) Field of Classification Search
CPC .................. G06C 20/3224; G06C 20/382
See application file for complete search history.

(56) References Cited

U.S. PATENT DOCUMENTS

| 6,021,944 | A | 2/2000 | Arakaki |
|---|---|---|---|
| 6,612,488 | B2 | 9/2003 | Suzuki |
| 6,896,182 | B2 | 5/2005 | Sakaguchi |
| 6,913,194 | B2 | 7/2005 | Suzuki |
| 6,948,656 | B2 | 9/2005 | Williams |
| 7,104,444 | B2 | 9/2006 | Suzuki |
| 7,548,886 | B2 | 6/2009 | Kirkland et al. |
| 7,669,759 | B1 | 3/2010 | Zettner |
| 7,669,760 | B1 | 3/2010 | Zettner |
| 8,825,073 | B1 | 9/2014 | Zettner |
| 2002/0130176 | A1 | 9/2002 | Suzuki |

(Continued)

OTHER PUBLICATIONS

Agilis Systems, Inc., "Work Smartest: Confirm Appointments & Intelligent Prospecting," 3 pages, 2006.

(Continued)

*Primary Examiner* — Ajit Patel
(74) *Attorney, Agent, or Firm* — Perkins Coie LLP (57) ABSTRACT

A location verification provision is implemented to determine the location of a device associated with a user at the time of an attempted transaction. The attempted transaction includes receiving user identification and/or payment information, which is associated with the device in an entry stored in a database. Location information of the device, as well as a time at each location, may also be stored in the database. To verify that the device is located at the location of the transaction, a comparison operation may be performed. If the device is located where the transaction is being processed, the transaction may be completed. Predetermined criteria may be defined to account for possible inaccuracies in location and time calculations.

12 Claims, 6 Drawing Sheets

(56) References Cited

U.S. PATENT DOCUMENTS

| | | | |
|---|---|---|---|
| 2002/0133467 A1* | 9/2002 | Hobson | G06Q 20/02 705/64 |
| 2003/0135463 A1 | 7/2003 | Brown et al. | |
| 2003/0182194 A1 | 9/2003 | Choey et al. | |
| 2004/0192337 A1 | 9/2004 | Hines et al. | |
| 2005/0133588 A1* | 6/2005 | Williams | G06Q 20/20 235/379 |
| 2005/0165684 A1 | 7/2005 | Jensen et al. | |
| 2005/0209917 A1 | 9/2005 | Anderson et al. | |
| 2006/0190346 A1 | 8/2006 | Sines et al. | |
| 2006/0194592 A1 | 8/2006 | Clough | |
| 2006/0237531 A1 | 10/2006 | Heffez et al. | |
| 2007/0034682 A1 | 2/2007 | Williams | |
| 2007/0055785 A1* | 3/2007 | Stevens | G06Q 20/32 709/229 |
| 2007/0084913 A1 | 4/2007 | Weston | |
| 2007/0100752 A1* | 5/2007 | Wallaja | G06F 21/43 705/44 |
| 2007/0100773 A1* | 5/2007 | Wallach | G06Q 20/382 705/75 |
| 2007/0173266 A1 | 7/2007 | Barnes | |
| 2007/0198432 A1* | 8/2007 | Pitroda | G06Q 20/02 705/64 |
| 2007/0239852 A1* | 10/2007 | Kotzin | H04W 64/00 709/218 |
| 2008/0032702 A1 | 2/2008 | Cone | |
| 2009/0098825 A1 | 4/2009 | Huomo et al. | |

OTHER PUBLICATIONS

Sprint, "Comet Tracker: Mobile Management Solution—Transportation & Distribution," 21 pages, no date.

Divis, Dee Ann, "Saving Private Location—Washington View," GPS World, 18 pages, Oct. 2003.

Guillaume, Gabriel et al., "The Integrated Operator: A Mobile Perspective," W3C Workshop: Mobile Web Initiative, 7 pages, Oct. 15, 2004.

* cited by examiner

GPS VALIDATION FOR TRANSACTIONS

CROSS-REFERENCE TO RELATED APPLICATIONS

This application is a continuation of U.S. patent application Ser. No. 11/590,996, filed Oct. 31, 2006, entitled "GPS Validation for Transactions," now allowed, the entire disclosure of which is herein incorporated by reference for all purposes. This application is also related by subject matter to the inventions disclosed in the following commonly assigned applications, the entireties of which are hereby incorporated by reference herein: U.S. patent application Ser. No. 11/591,031 and U.S. patent application Ser. No. 11/591,004, each filed on Oct. 31, 2006 and each entitled "GPS Validation for Transactions."

BACKGROUND

A user may complete transactions, such as purchasing items and/or services, at a retail location using a credit card or debit card or other payment form as a payment source. Unfortunately, credit and debit cards may be stolen and may be used to complete transactions by the thief and not the user who owns and is responsible for the payment cards.

Other fraudulent operations may ensue in credit, debit, and/or other payment form transactions. For example, a user may complete a transaction using a credit and/or debit card but may later dispute the transaction in an attempt to relieve the user of responsibility for payment.

These and other fraudulent activities are clearly detrimental to the user, the retail location where the transaction is occurring, and/or the credit and/or debit card company. The credit card company, in one example, may hold the retail location responsible for payment if a fraudulent user completes a transaction with a stolen credit card. Alternately, the user who did not attempt the transaction but whose payment card was used for the transaction may be held responsible for payment. Or the credit card company may hold neither the retail location nor the user responsible but will then lose the payment funds.

A location verification process and system that secures a transaction by verifying the location of a user at a time of the transaction is both advantageous and desirable for eliminating fraudulent transactions.

SUMMARY

A location of a device is compared to a transaction location, such as a retail location, to determine if the device is at the transaction location when a transaction is attempted. Information related to the device is stored in, for example, a database or other storage component with user identification and/or user payment information. When a user attempts payment for a transaction, the information related to the device associated with the user may be obtained. The location of the device is determined through, for example, global positioning system information. If the device is not at the transaction location, the transaction may be stopped. Predetermined criteria may be incorporated to account for the device being near the transaction location and for the device being at the transaction location near the transaction time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing summary and the following detailed description are better understood when read in conjunction with the appended drawings. Exemplary embodiments are shown in the drawings, however it is understood that the embodiments are not limited to the specific methods and instrumentalities depicted therein. In the drawings.

DETAILED DESCRIPTION OF ILLUSTRATIVE EMBODIMENTS

Embodiments are related to verifying a location of a transaction. The verification may be used to confirm that a user is actually at the location where the transaction is taking place and may be used prior to completing the transaction. Additionally, the verification may be used at a later time to serve as confirmation that the user was at the location at the time of the transaction.

Figure 1:
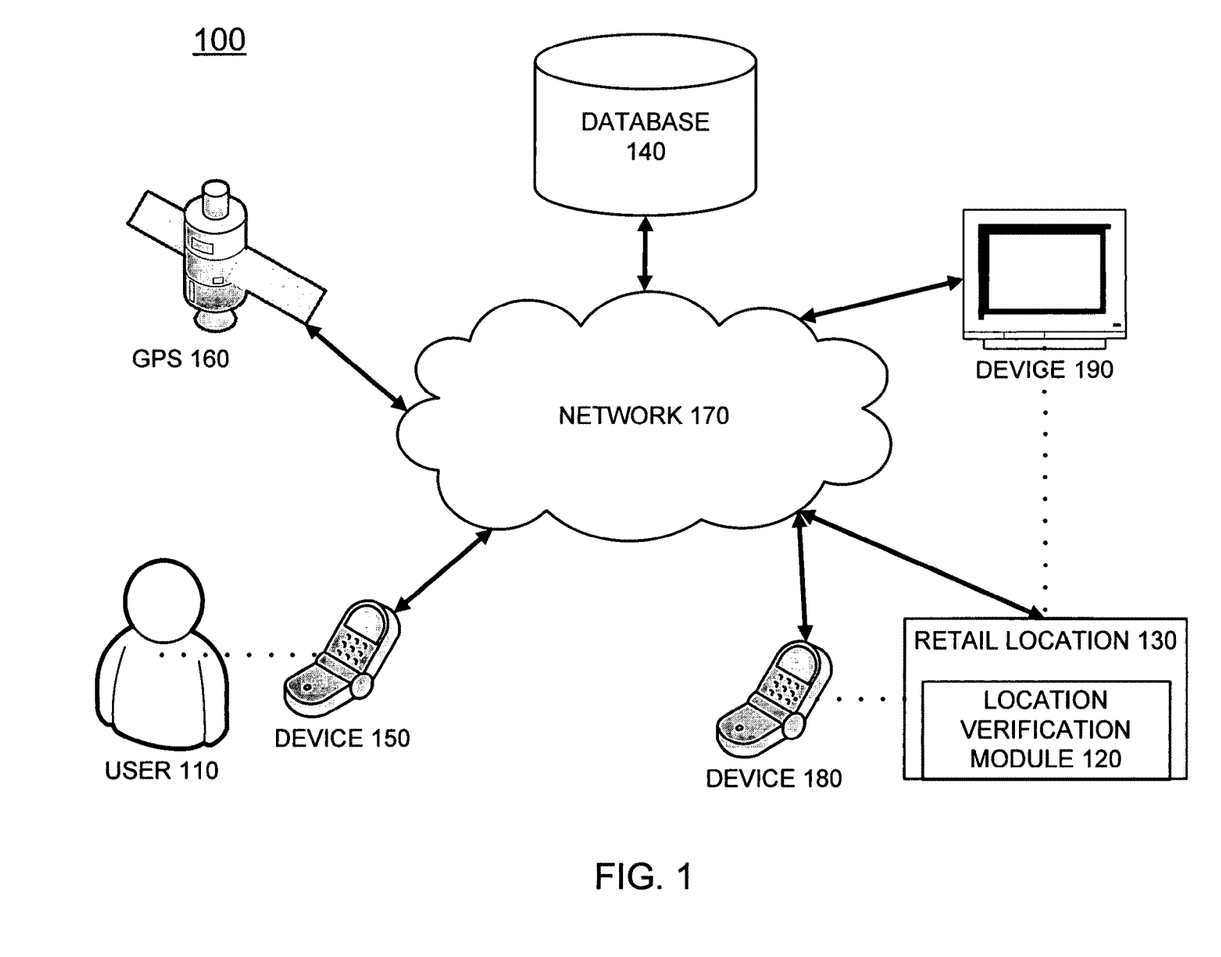
FIG. 1 is a block diagram representing an example location verification system according to an embodiment.

FIG. 1 illustrates an example system 100 in which aspects of the invention may be employed. System 100 may include device 150 associated with user 110, location verification module 120, device 180 associated with retail location 130, database 140, device 190, and global positioning system (GPS) 160. Retail location 130 may be any type of entity capable of providing purchases and/or services to user 110. Retail location 130 may be a physical location, such as a department store or a car dealership, or a virtual store, such as an online shopping center. Retail location 130 may include location verification module 120. Location verification module 120 may operate to verify a location of user 110 to secure a transaction. Location verification module 120 may employ device 150 associated with user 110, device 190, and GPS 160 to assist in a location verification process. Device 180 associated with retail location 130 may be a wired or wireless phone, a computer, a facsimile machine, a personal digital assistant (PDA), and the like, for example. Device 180 may be utilized by retail location for receiving information from and providing information to location verification module 120.

User 110, verification module 120, retail location 130, database 140, device 150, GPS 160, device 180, and device 190 may communicate with one another by way of communication network 170, which may include an intranet, the Internet, a local area network (LAN), a wide area network (WAN), a public switched telephone network (PSTN), a cellular network, a voice over internet protocol (VoIP) network, and the like, for example. User 110 may communicate with location verification module 120 and retail location 130 physically, through device 150, through device 190, or a combination of physically and through device 150 and device 190, for example. Device 150 and device 190 may be a wired or wireless phone, a computer, a facsimile machine, a personal digital assistant (PDA), and the like, for example. Device 150 and device 190 may include a receiver, such as, for example, a GPS receiver for receiving GPS information, such as coordinate and time information, related to device 150 and device 190. Device 150 and device 190 are not limited to the same type of device. For example, device 150 may be a wireless phone while device 190 may be a computer. Furthermore, device 190 may not be associated with user 110 but may instead be a public computer, for example, which may be accessed by various consumers at a cyber store.

User 110 may attempt to complete a transaction at retail location 130. A transaction may be performed online over communication network 170, for example. For a virtual or online transaction, device 190 may be employed by user 110. For example, user 110 may access an internet site dedicated to retail location 130 through device 190. Alternatively, user 110 may physically visit or otherwise communicate with retail location 130 in order to complete the transaction. The transaction process may also be a combination of an online process and/or a personal visit and/or other communication such as a telephone call or written correspondence, for example. The transaction process may include payment, in which user 110 is required to provide credit card, debit card, check, and/or electronic-check (e-check) information, for example. Other information may also be required at the discretion of retail location 130, a credit card company, a debit card company, a check provider, and/or an e-check provider.

The transaction process may include a location verification provision. The location verification provision may be employed by retail location 130 through location verification module 120, which may employ GPS 160, to ensure that user 110, who is attempting to complete a transaction at retail location 130, is located at retail location 130. If retail location 130 is an online store, the location verification provision may be employed to ensure that user 110, who is employing device 190 to attempt a transaction through the online store, is located with device 190.

Database 140 may be, for example, a database or other storage module, device, or memory, for example. Database 140 may operate to store multiple user identifiers, where each user identifier is associated with a user. A user identifier may include information related to a payment form of a user, identification related to the user, and a device associated with the user. Each user identifier may comprise, for example, a randomly generated character and/or number string. For example, a user identifier associated with user 110 may include one or more credit and/or debit cards owned by user 110, an identification given to user 110 which may be, for example, a randomly generated character and/or number string or a name of user 110, and information related to device 150 associated with user 110, such as, for example, a mobile phone number. Database 140 may be maintained by a central authority, one or more credit card companies, or one or more banks (not shown), for example.

In addition to storing user identifiers, database 140 may further store multiple transaction identifiers, each associated with a transaction. A transaction identifier may be a character and/or number string assigned to a transaction and may include details related to the transaction, such as, for example, the location, date, time, and/or transaction amount of the transaction. Furthermore, a transaction identifier may be associated with a user identifier in database 140. For example, if user 110 completes multiple transactions, each assigned a transaction identifier, each transaction identifier may be linked to or stored with the user identifier of user 110.

GPS 160 may assist in the determination of a location of device 150 associated with user 110. GPS 160 may include multiple satellites that orbit above the Earth. The GPS satellites may each contain a computer, an atomic clock, and a radio, operating to continuously broadcasts its changing position and time. A GPS receiver, such as the receiver in device 150, may contain a computer or processing unit operating to calculate the position of the GPS receiver through receipt of time signals. The position may be calculated from three satellites through a process called trilateration or through a process called triangulation, for example. The position may be provided in the form of a longitude and latitude. The GPS receiver may further calculate altitude, speed of travel, and direction of travel.

Moreover, database 140 may also store GPS information related to multiple users, such as user 110. For example, as GPS 160 may continuously detect the location of user 110 (through device 150 associated with user 110), the location of user 110, along with the time, may be stored in database 140. To conserve storage space in database 140, the GPS information may be stored at a predetermined time interval and may be deleted after a predetermined time period has elapsed. For example, GPS 160 may provide the GPS information related to user 110 to database 140 every 20 minutes. Database 140 may delete the GPS information related to user 110 after the information has been stored for 30 days. The authority maintaining database 140 may decide the factors (e.g. which consumers to include, when to perform the deletions) concerning database 140, for example.

Figure 2:
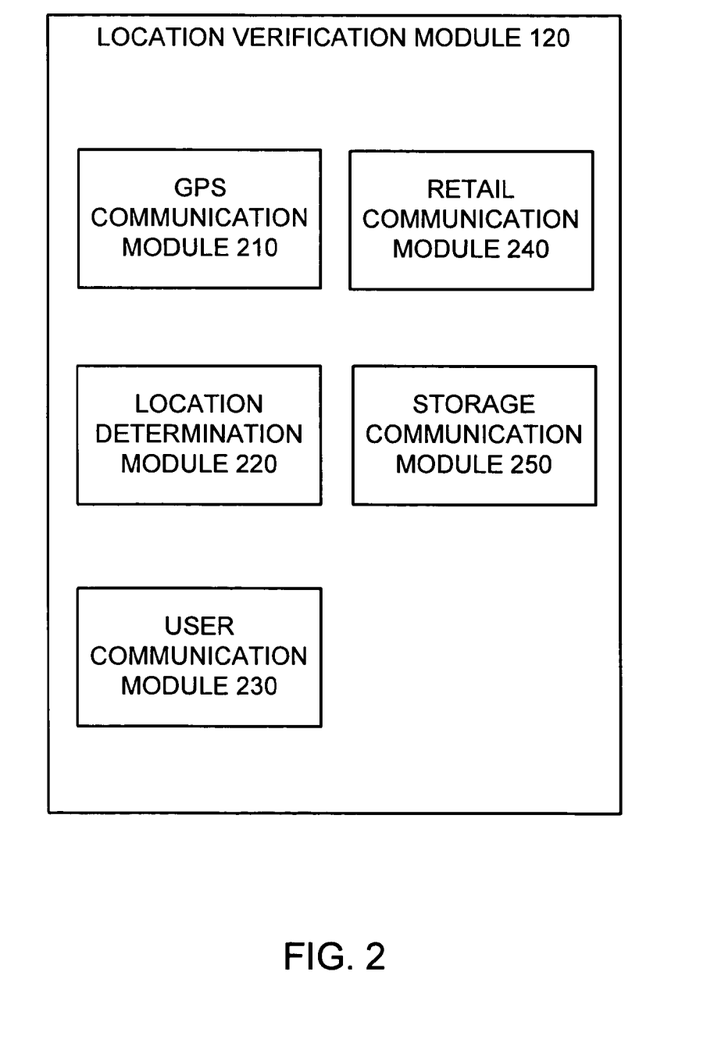
FIG. 2 is a block diagram representing an example location verification module according to an embodiment.

FIG. 2 illustrates a block diagram of an example verification module 120. Verification module 120 may include several means, devices, software, and/or hardware for performing functions, including GPS communication module 210, location determination module 220, user communication module 230, retail location communication module 240, and storage communication module 250. Verification module 120 may operate to verify a location of user 110 at the time of a transaction. The verification of the location of user 110 may assist retail location 130 in confirming that user 110 is the consumer attempting to complete a transaction at retail location 130. Moreover, the verification of the user 110 may provide assurance to user 110 that another consumer may not use a credit, debit, and/or other payment card and/or forms associated with user 110.

A location verification provision may be initiated by retail location 130 for every transaction conducted at retail location. Alternately, retail location 130 may choose to implement the provision based on predetermined criteria. For example, retail location 130 may initiate the provision if an attempted transaction exceeds a predetermined transaction amount. Or the provision may be initiated randomly or when a consumer who has not previously completed transactions at retail location 130 attempts to do so. The initiation may be performed by operating device 180 and may include, for example, sending an email message or phone call to location verification module 120. The initiation indication may be received by retail location communication module 240.

Alternately, the location verification provision may be automatically implemented by location verification module 120 based on predetermined criteria. The automatic provision may occur by receiving information related to each transaction at retail location 130, for example. After the information is received, by, for example, retail communication module 240, location verification module 120 may analyze the transaction details to determine if the predetermined criteria are met.

Upon indication to initiate a location verification of user 110 attempting to complete a transaction at retail location 130, location verification module 120 may be responsible for the location verification. Retail location communication module 240 may receive a location verification initiation indication from retail location 130. The indication from retail location 130 may include a time at which the transaction is attempted. Module 240 may provide the indication to storage communication module 250, which may operate to identify a user identifier associated with user 110. Storage communication module 250 may communicate with database 140 and may provide, for example, a credit card number or a checking account routing number as provided by user 110. Database 140 may use the credit card number or routing number to identify the user identifier associated with user 110. An identification of user 110 as well as information related to device 150 may be stored with the credit card number or routing number as the user identifier. The user identifier may be provided by database 140 to storage communication component 250.

Storage communication component 250, upon receipt of the user identifier associated with user 110, may provide the information related to device 150, as presented in the user identifier, as well as the time at which the transaction is attempted, to GPS communication module 210. GPS communication module 210 may operate to obtain the GPS information of device 150 at the attempted transaction time. GPS information may include the longitude and latitude coordinates, as well as the time, of device 150. The desired GPS information may be obtained from the GPS information stored in database 140 and may be provided to location determination module 220 from GPS communication module 210.

Location determination module 220 may operate to, from the coordinate information, determine the location of device 150. The location may be in the form of an address, with a street number, city, and state, for example. Location determination module 220 may provide the determined location to retail location communication module 240 for further communication with retail location 130.

Upon receipt of the location of device 150 from retail location communication module 240, retail location 130 may decide whether to complete the transaction being attempted by user 110. For example, if the location of device 150, as received from retail location communication module 240, is the same as the location of retail location 130, the transaction may be completed. The same location of device 150 and retail location 130 may serve as indication to retail location 130 that user 110, who owns the credit, debit, and/or other payment card associated with device 150, is in retail location 130 and that a fraudulent consumer is not attempting to use the payment card of user 110. On the other hand, if the location of device 150 is different than the location of retail location 130, retail location 130 may decide to cancel the transaction before its completion. A varying location may serve as an indication that user 110 is not actually at retail location 130, as is commonly assumed.

User communication module 230, upon determination of the location of device 150 by location determination component 220, may operate to contact device 150. User 110, upon operation of device 150, may be informed of the attempted transaction and may be prompted to indicate if the transaction should be completed. Such an operation may serve as an additional security feature. For example, an operator at retail location 130 may incorrectly determine that the location of device 150 is the same as the location of retail location 130. Moreover, user 110 may provide a credit card owned by user 110 to a trusted consumer, such as a friend or family member, to complete a transaction. If device 150 associated with user 110 is with user 110, location determination module 220 will accordingly determine different locations. However, if user 110 is contacted by user communication module 230, the transaction may proceed as desired by user 110.

Alternate to retail location communication module 240 providing the location of device 150, location determination module 220 may further operate to determine if the location of device 150 is the same as the location of retail location 130. The location of retail location 130, in the form of an address or GPS coordinates or another form, may be stored in database 140. If retail location 130 is an internet store being accessed through device 190, the location of device 190 may be required for location verification. If device 190 is a fixed computer with a known location, for example a computer at a cyber store, the location of device 190 in the form of an address or GPS coordinates or another form may be stored in database 140. Alternately, if device 190 is a mobile device, such as a laptop which may change locations, GPS 160 may determine the location of device 190. The GPS information of device 190 may be stored in database 140 and may be used by location verification module 120 for the location verification process.

Location determination module 220 may perform a comparison operation between the determined location of device 150 and the known location of retail location 130 or between the determined location of device 150 and the determined location of device 190. The result of the comparison operation may be provided to retail location 130 through retail location communication module 240. Retail location 130 may receive the results through a phone call, text message, email, or other message through device 180 associated with retail location 130. The result may indicate, for example and not limitation, a same location at a same time, a same location at a different time, a different location at a same time, or a different location at a different time. Retail location 130 may proceed based upon predetermined rules. For example, if the results indicate that device 150 was at retail location 130 ten minutes prior to the attempted transaction, retail location 130 may assume that the location of device 150 was updated in database 140 before the transaction occurred.

If device 190 is used as a virtual store of retail location 130, the results of the comparison operation may be provided to an administrator of the virtual store through retail location communication module 240. The results may be received through a phone call, text message, email, or other message through device 190.

Figure 3:
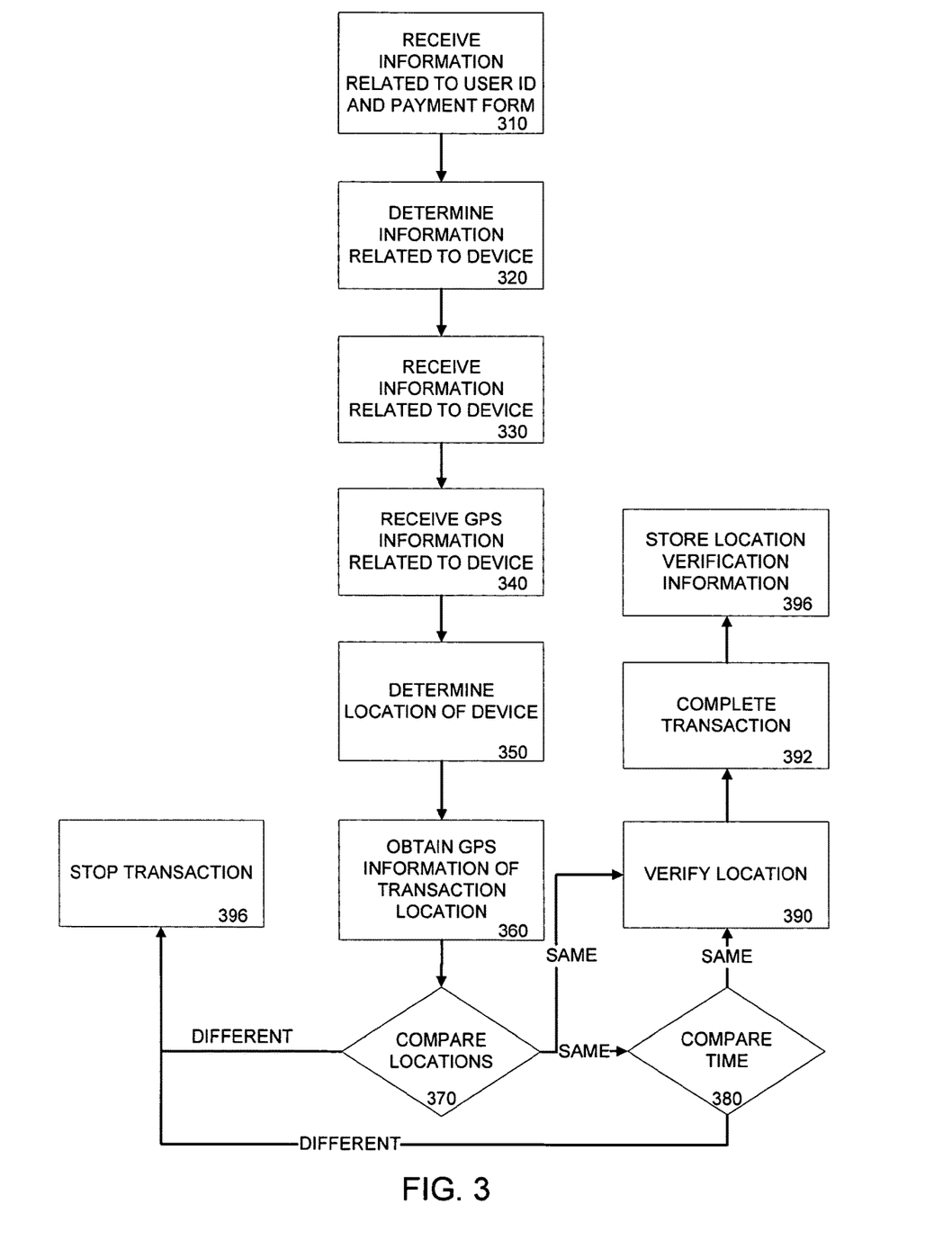
FIG. 3 is a flow chart illustrating an example method of verifying a location of a transaction according to an embodiment.

FIG. 3 is a flow chart illustrating an example method of verifying a location of a transaction according to an embodiment. A consumer may be attempting to purchase goods and/or services as a transaction at retail location 130 physically or through device 190. The transaction may include payment with a payment card such as a credit and/or debit card. Other payment forms may also be used. Retail location 130 may desire to verify the location of user 110, who is associated with the payment form and device 150. If the location of user 110 associated with the payment form is found to be at a location other than the transaction location (the location of retail location 130 or the location of device 190), then retail location 130 or an administrator of device 190 (which may also be retail location 130) may stop the transaction from completing because the consumer attempting the transaction is not associated with the payment form. If, on the other hand, the consumer associated with the payment form (user 110) is at the transaction location, retail location 130 may proceed with the transaction.

Referring to FIG. 3, at 310 information related to user 110 is received. User 110 may provide retail location 130 with a payment form, such as a credit card or e-check. The payment form information may be associated with user 110 in a user identifier entry stored in database 140. Retail location 130, wishing to verify the location of user 110 associated with the credit card, may provide the payment form information to location verification module 120 through, for example, device 180. Receipt of the information may serve as an indication to location verification module 120 to perform a location verification using the provided information. Alternately, retail location 130 may provide an identification given to user 110 to location verification module 120. The identification, which may be a randomly generated character and/or number string or a name of user 110, and/or the payment form information may both be included in the user identifier entry associated with user 110. Alternately, location verification module 120 may automatically receive the payment form information and/or user identification.

At 320, information related to device 150 associated with the user identifier is determined. Retail communication module 240 may communicate the payment form information and/or the user identification information to storage communication module 250. Storage communication module 250 may access database 140. The user identification of user 110, the payment form of user 110, and/or device 150 associated with user 110 may be linked together in the user identifier entry stored in database 140. Storage communication module 250 may then accordingly determine information related to device 150 of user 110 whose card is presented for the transaction from the user identifier entry.

At 330, the information related to device 150 is received by, for example, GPS communication module 210. At 340, GPS information related to device 150 is received. The information related to device 150 may be provided to storage communication module 250 to search database 140. Database 140 may store GPS information related to device 150. The GPS information may be obtained by storage communication module 250, which may provide the GPS information to location determination module 220.

At 350, the location of device 150 is determined. The determination may be computed by, for example, location determination module 220 through the GPS information. For example, based upon the GPS information, a street address or other location may be computed. At 360, GPS information of retail location 130 or device 190 is obtained. This information may also be stored in database 140 and obtained by storage communication module 250. Alternately, this information may be obtained by GPS 160 if device 190 is a mobile or wireless device, stored in database 140, and obtained by storage communication module 250.

At 370, the determined location of device 150 is compared to the known location of retail location 130 or to the known or determined location of device 190. The comparison operation may be performed by location determination module 220.

Optionally at 380, if the comparison operation at 370 results in a same location, a determination may be made as to whether device 150 is at retail location 130 or with device 190 at the time the transaction is attempted. This subsequent determination may also be computed by location determination module 220. This determination may be made through analysis of the GPS information, which may also include information related to the time at each location of device 150.

At 390, following confirmation of the same location at 370 and/or the optional confirmation of same time at 380, the location is verified. Thus, it is confirmed that device 150 is located at retail location 130 or with device 190 for the attempted transaction. This confirmation, provided by retail communication module 240 to retail location 130 through device 180 or to an administrator of device 190, may indicate that fraudulent use is not being attempted.

At 392, the transaction may accordingly be completed by retail location 130. At 394, the location verification information is stored in database 140 for possible later use. If user 110, for example, attempts to dispute the transaction, retail location 130 may obtain the stored location verification information as proof that user 110 was at retail location 130 or with device 190 at the time of the transaction.

At 396, following determination that the location and/or the time are not the same at 370 and 380, the transaction is cancelled. A varying location may indicate that device 150, and hence user 110, is not the consumer attempting to complete the transaction at retail location 130 or with device 190. Similarly, a varying time may indicate that device 150, and hence user 110, was not at retail location 130 or with device 190 at the time that the transaction was attempted.

Figure 4:
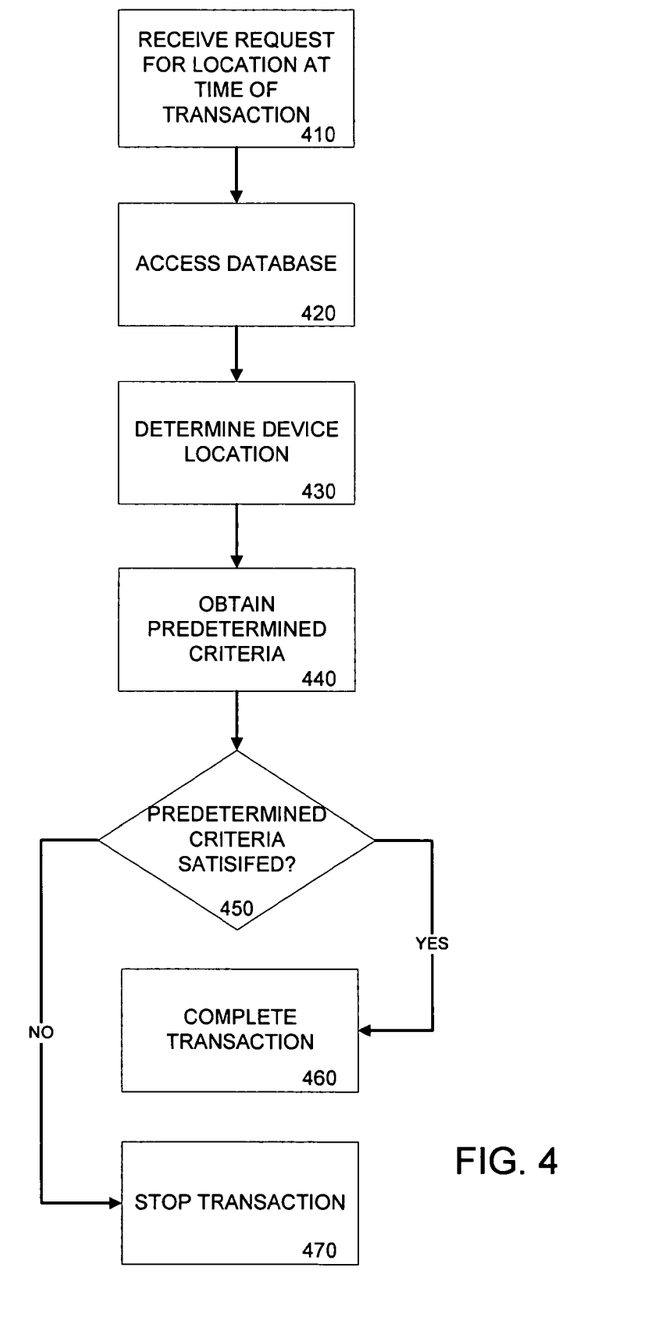
FIG. 4 is a flow chart illustrating an example method of verifying a location of a transaction according to another embodiment.

FIG. 4 is a flow chart illustrating an example method of a transaction process according to an additional embodiment. At 410, a request for a location of device 150 at a time of an attempted transaction is received. The request may be made by retail location 130 through device 180 or by an administrator of device 190 to location verification module 120. The request may include a time and a user identifier that associates user 110 with device 150. The user identifier may be obtained through database 140, which may store multiple user identifiers that each associate a user with a device and with a payment form, such as a credit card, debit card, or checking account.

At 420, database 140 is accessed to obtain the requested location of device 150 at the time of the attempted transaction. GPS 160 may provide the location of device 150 at predetermined intervals to database 140. Database 140 may be searched by utilizing the user identifier associated with device 150. The search results may be obtained by storage communication module 250, which may be responsible for handling and transmitting database search results.

At 430, the location of device 150 is determined. The determination may be computed by location determination module 220 upon receipt of location information from storage communication module 250.

At 440, predetermined criteria are obtained by, for example, the location determination module 220. The predetermined criteria may be provided by retail location 130 or an administrator of device 190 or may be stored in database 140. To verify the location of device 150, predetermined criteria may need to be satisfied. The predetermined criteria may dictate that to complete the transaction by verifying the location of device 150, the location of device 150 must exactly match the location of retail location 130 or device 190. The predetermined criteria may also dictate that device 150 must be at retail location 130 or with device 190 at the exact time of the attempted transaction. Alternately, the predetermined criteria may be flexible regarding the location and/or time to complete the transaction. For example, the determined location of device 150 may be within a predetermined distance of retail location 130 or device 190 to account for possible inaccuracies in the determined location. Alternately or additionally, device 150 may be at retail location 130 or with device 190 within a predetermined time period of the attempted transaction time. Other criteria are also possible. The criteria may be the same for each consumer or may vary as decided by retail location 130.

At 450, a determination is made as to whether the predetermined criteria are satisfied. Location determination module 220 may compare the predetermined criteria with the determined location and time to determine if the transaction should proceed.

At 460, if the criteria are satisfied, the transaction may be completed. The satisfaction of the criteria may serve as an indication that device 150 is at retail location 130 or with device 190 at the transaction time, as dictated by the predetermined criteria. At 470, if the criteria are not satisfied, the transaction is stopped. This may serve as an indication that device 150 is not verified as being at retail location 130 or with device 190 at the time of the attempted transaction as defined by the predetermined criteria.

Figure 5:
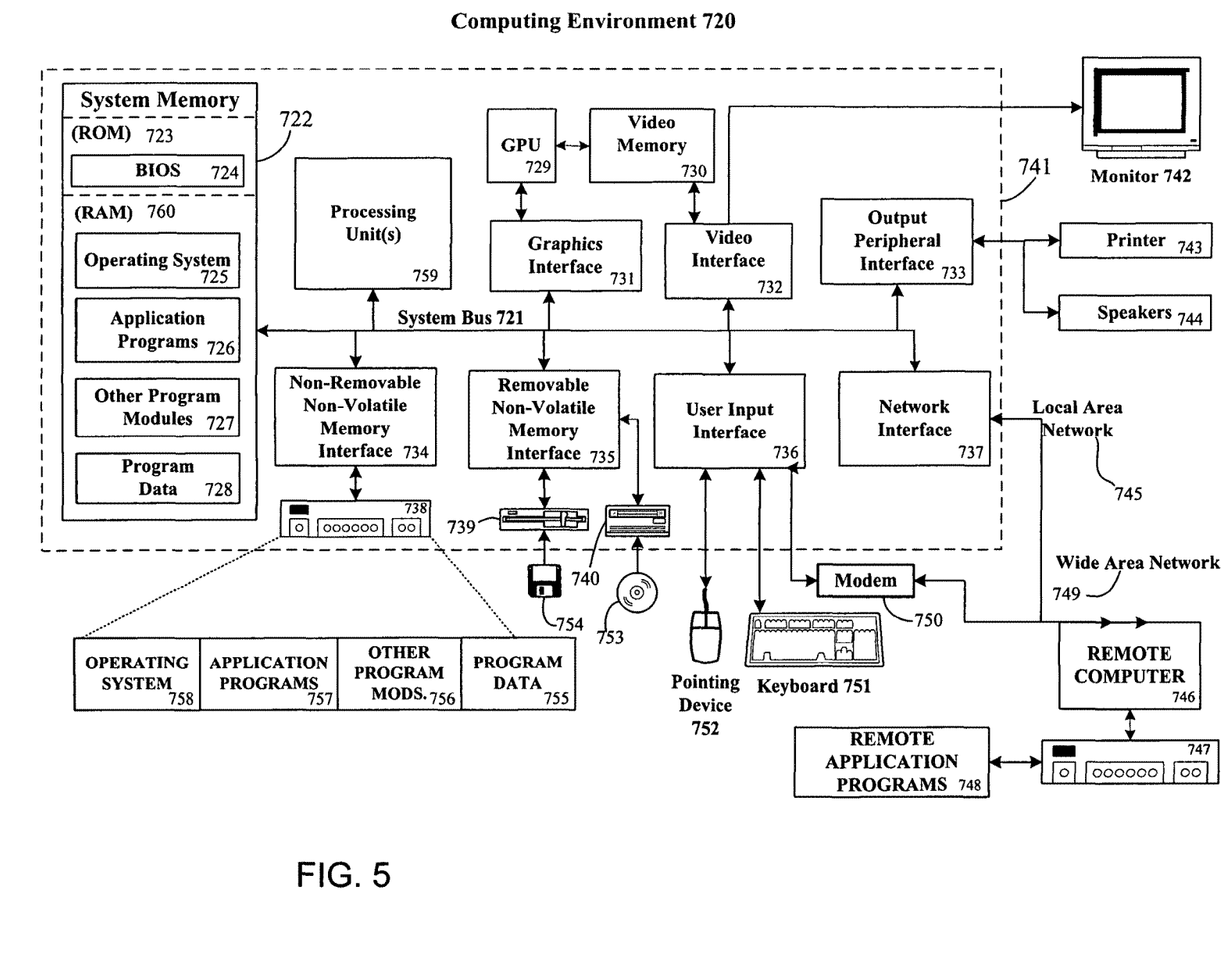
FIG. 5 is a block diagram representing an example computing device environment.

Referring to FIG. 5, shown is a block diagram representing an exemplary computing device suitable for use in conjunction with implementing the systems and methods described above. For example, the computer executable instructions that carry out the processes and methods described herein may reside and/or be executed in such a computing environment as shown in FIG. 5. The computing system environment 720 is only one example of a suitable computing environment and is not intended to suggest any limitation as to the scope of use or functionality of the presently disclosed subject matter. Neither should the computing environment 720 be interpreted as having any dependency or requirement relating to any one or combination of components illustrated in the exemplary operating environment 720.

Aspects of the presently disclosed subject matter are operational with numerous other general purpose or special purpose computing system environments or configurations. Examples of well known computing systems, environments, and/or configurations that may be suitable for use with the this subject matter include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the presently disclosed subject matter may be implemented in the general context of computer-executable instructions, such as program modules, being executed by a computer. Generally, program modules include routines, programs, objects, components, data structures, etc. that perform particular tasks or implement particular abstract data types. Aspects of the presently disclosed subject matter may also be practiced in distributed computing environments where tasks are performed by remote processing devices that are linked through a communications network. In a distributed computing environment, program modules may be located in both local and remote computer storage media including memory storage devices.

An exemplary system for implementing aspects of the presently disclosed subject matter includes a general purpose computing device in the form of a computer 741. Components of computer 741 may include, but are not limited to, a processing unit 759, a system memory 722, and a system bus 721 that couples various system components including the system memory to the processing unit 759.

The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 741 typically includes a variety of computer readable media. Computer readable media can be any available media that can be accessed by computer 741 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 741.

The system memory 722 includes computer storage media in the form of volatile and/or nonvolatile memory such as read only memory (ROM) 723 and random access memory (RAM) 760. A basic input/output system 724 (BIOS), containing the basic routines that help to transfer information between elements within computer 741, such as during start-up, is typically stored in ROM 723. RAM 760 typically contains data and/or program modules that are immediately accessible to and/or presently being operated on by processing unit 759. By way of example, and not limitation, FIG. 5 illustrates operating system 725, application programs 726, other program modules 727, and program data 728.

The computer 741 may also include other removable/non-removable, volatile/nonvolatile computer storage media. By way of example only, FIG. 5 illustrates a hard disk drive 738 that reads from or writes to non-removable, nonvolatile magnetic media, a magnetic disk drive 739 that reads from or writes to a removable, nonvolatile magnetic disk 754, and an optical disk drive 740 that reads from or writes to a removable, nonvolatile optical disk 753 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 738 is typically connected to the system bus 721 through an non-removable memory interface such as interface 734, and magnetic disk drive 739 and optical disk drive 740 are typically connected to the system bus 721 by a removable memory interface, such as interface 735.

The drives and their associated computer storage media discussed above and illustrated in FIG. 5, provide storage of computer readable instructions, data structures, program modules and other data for the computer 741. In FIG. 5, for example, hard disk drive 738 is illustrated as storing operating system 758, application programs 757, other program modules 756, and program data 755. Note that these components can either be the same as or different from operating system 725, application programs 726, other program modules 727, and program data 728. Operating system 758, application programs 757, other program modules 756, and program data 755 are given different numbers here to illustrate that, at a minimum, they are different copies. A user may enter commands and information into the computer 741 through input devices such as a keyboard 751 and pointing device 752, commonly referred to as a mouse, trackball or touch pad. Other input devices (not shown) may include a microphone, joystick, game pad, satellite dish, scanner, or the like. These and other input devices are often connected to the processing unit 759 through a user input interface 736 that is coupled to the system bus, but may be connected by other interface and bus structures, such as a parallel port, game port or a universal serial bus (USB). A monitor 742 or other type of display device is also connected to the system bus 721 via an interface, such as a video interface 732. In addition to the monitor, computers may also include other peripheral output devices such as speakers 744 and printer 743, which may be connected through a output peripheral interface 733.

The computer 741 may operate in a networked environment using logical connections to one or more remote computers, such as a remote computer 746. The remote computer 746 may be a personal computer, a server, a router, a network PC, a peer device or other common network node, and typically includes many or all of the elements described above relative to the computer 741, although only a memory storage device 747 has been illustrated in FIG. 5. The logical connections depicted in FIG. 5 include a local area network (LAN) 745 and a wide area network (WAN) 749, but may also include other networks. Such networking environments are commonplace in offices, enterprise-wide computer networks, intranets and the Internet.

When used in a LAN networking environment, the computer 741 is connected to the LAN 745 through a network interface or adapter 737. When used in a WAN networking environment, the computer 741 typically includes a modem 750 or other means for establishing communications over the WAN 749, such as the Internet. The modem 750, which may be internal or external, may be connected to the system bus 721 via the user input interface 736, or other appropriate mechanism. In a networked environment, program modules depicted relative to the computer 741, or portions thereof, may be stored in the remote memory storage device. By way of example, and not limitation, FIG. 5 illustrates remote application programs 748 as residing on memory device 747. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the said subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, handheld devices, supercomputers, or computers integrated into other systems.

In light of the diverse computing environments that may be built according to the general framework provided in FIG. 5, the systems and methods provided herein cannot be construed as limited in any way to a particular computing architecture. Instead, the presently disclosed subject matter should not be limited to any single embodiment, but rather should be construed in breadth and scope in accordance with the appended claims.

Figure 6:
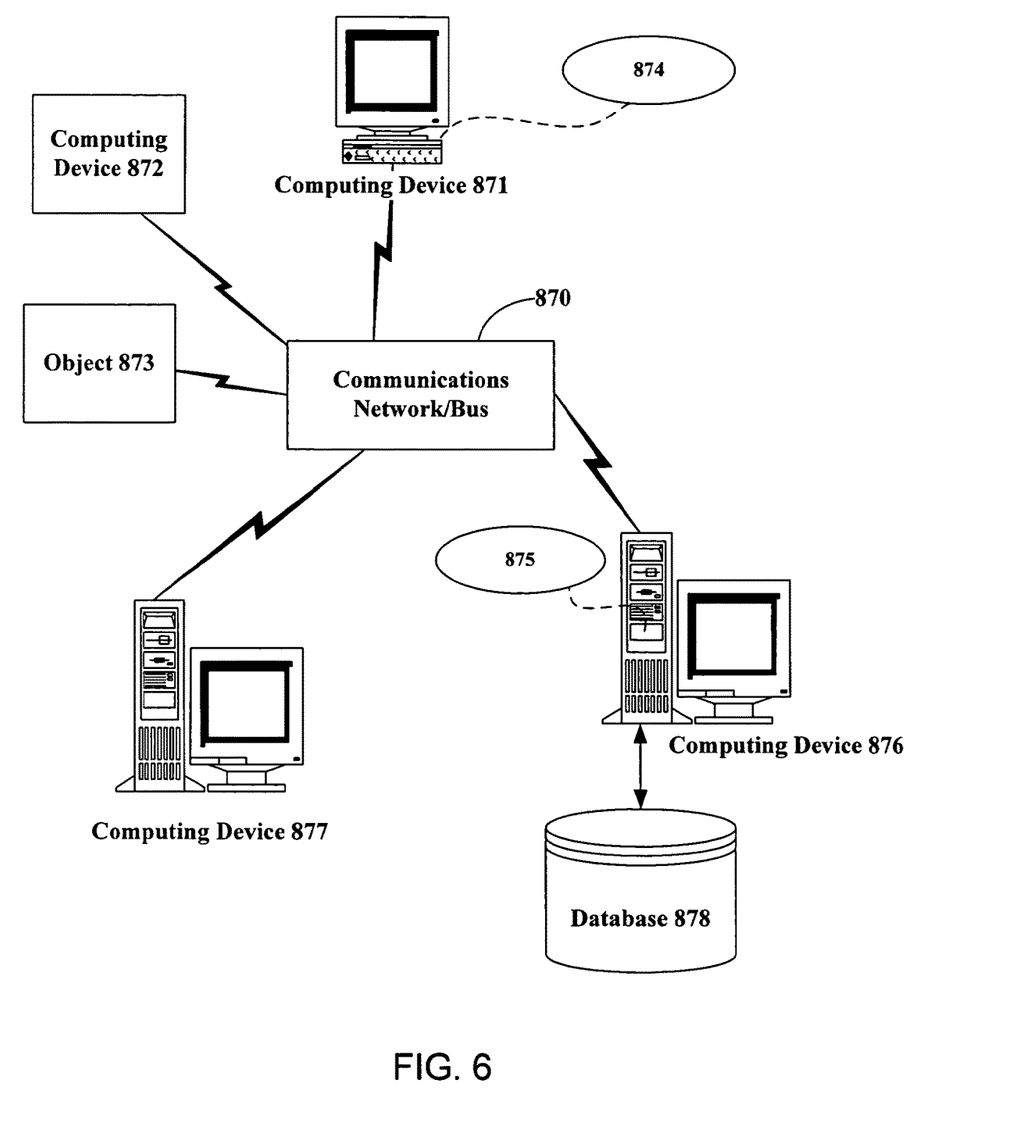
FIG. 6 is a block diagram representing an example networked computing environment.

Referring next to FIG. 6, shown is an exemplary networked computing environment in which many computerized processes may be implemented to perform the processes described above. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 6 provides a schematic diagram of an exemplary networked or distributed computing environment. The environment comprises computing devices 871, 872, 876, and 877 as well as objects 873, 874, and 875, and database 878. Each of these entities 871, 872, 873, 874, 875, 876, 877, and 878 may comprise or make use of programs, methods, data stores, programmable logic, etc. The entities 871, 872, 873, 874, 875, 876, 877, and 878 may span portions of the same or different devices such as PDAs, audio/video devices, MP3 players, personal computers, etc. Each entity 871, 872, 873, 874, 875, 876, 877, and 878 can communicate with another entity 871, 872, 873, 874, 875, 876, 877, and 878 by way of the communications network 870. In this regard, any entity may be responsible for the maintenance and updating of a database 878 or other storage element.

This network 870 may itself comprise other computing entities that provide services to the system of FIG. 6, and may itself represent multiple interconnected networks. In accordance with an aspect of the presently disclosed subject matter, each entity 871, 872, 873, 874, 875, 876, 877, and 878 may contain discrete functional program modules that might make use of an API, or other object, software, firmware and/or hardware, to request services of one or more of the other entities 871, 872, 873, 874, 875, 876, 877, and 878.

It can also be appreciated that an object, such as 875, may be hosted on another computing device 876. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 6, any entity 871, 872, 873, 874, 875, 876, 877, and 878 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 6 and the further diversification that can occur in computing in a network environment such as that of FIG. 6, the systems and methods provided herein cannot be construed as limited in any way to a particular computing architecture or operating system. Instead, the presently disclosed subject matter should not be limited to any single embodiment, but rather should be construed in breadth and scope in accordance with the appended claims.

As mentioned above, while exemplary embodiments of the invention have been described in connection with various computing devices, the underlying concepts may be applied to any computing device or system. Thus, the methods and systems of the present invention may be applied to a variety of applications and devices. While exemplary names and examples are chosen herein as representative of various choices, these names and examples are not intended to be limiting. One of ordinary skill in the art will appreciate that there are numerous ways of providing hardware and software implementations that achieves the same, similar or equivalent systems and methods achieved by the invention.

As is apparent from the above, all or portions of the various systems, methods, and aspects of the present invention may be embodied in hardware, software, or a combination of both.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed:

1. A computerized method comprising:
   receiving, by a virtual retail location of a merchant from a transacting computing device, an account identifier associated with a user;
   receiving a location of the transacting computing device;
   receiving, by a location verification module integrated with a merchant computing device of the merchant, information related to a location and a time of a user device associated with the account identifier;
   comparing, by the location verification module integrated with the merchant computing device of the merchant, the location of the user device with the location of the transacting computing device;
   determining, by the location verification module integrated with the merchant computing device of the merchant, whether the location of the user device is within a range of the location of the transacting computing device;
   receiving, by the virtual retail location of the merchant, a request for a transaction; and
   canceling the transaction prior to transmitting a transaction authorization request to a transaction validation system when the location of the user device is not within the range of the location of the transacting computing device.

2. The computerized method of claim 1, further comprising:
   receiving, by the virtual retail location of the merchant, a request for a transaction; and sending a transaction authorization request to an authorization service when the location of the user device is within the range of the location of the transacting computing device.

3. The computerized method of claim 1, wherein the transacting computing device is a public computing device.

4. The computerized method of claim 1, further comprising:
   transmitting, by the merchant computing device to a remote database, a request for the location of the user device and the location of the transacting computing device.

5. The computerized method of claim 1, wherein the location verification module is initiated by the merchant computing device when the user is randomly selected.

6. The computerized method of claim 1, further comprising:
   receiving, by the virtual retail location of the merchant, a request for a transaction; and
   when the location of the user device is not within the range of the location of the transacting computing device, sending an authorization request to the user device for authorization to complete a transaction.

7. A non-transitory, computer-readable medium comprising instructions that, when executed by one or more processors, cause a machine to:
   receive an account identifier associated with a user, the account identifier received from a transacting computing device;
   receive a location of the transacting computing device;
   receive information related to a location and a time of a user device associated with the account identifier;
   compare the location of the user device with the location of the transacting computing device;
   determine whether the location of the user device is within a range of the location of the transacting computing device;
   receive a request for a transaction; and
   cancel the transaction prior to transmitting a transaction authorization request to a transaction validation system when the location of the user device is not within the range of the location of the transacting computing device.

8. The non-transitory, computer-readable medium of claim 7, wherein the non-transitory, computer-readable medium comprises instructions that, when executed by the one or more processors, further cause the machine to:
   receive a request for a transaction; and
   send a transaction authorization request to an authorization service when the location of the user device is within the range of the location of the transacting computing device.

9. The non-transitory, computer-readable medium of claim 7, wherein the transacting computing device is a public computing device.

10. The non-transitory, computer-readable medium of claim 7, wherein the non-transitory, computer-readable medium comprises instructions that, when executed by the one or more processors, further cause the machine to:
    transmit, to a remote database, a request for the location of the user device and the location of the transacting computing device.

11. The non-transitory, computer-readable medium of claim 7, wherein comparing the location of the user device with the location of the transacting computing device is initiated when the user is randomly selected.

12. The non-transitory, computer-readable medium of claim 7, wherein the non-transitory, computer-readable medium comprises instructions that, when executed by the one or more processors, further cause the machine to:
    receive a request for a transaction; and
    when the location of the user device is not within the range of the location of the transacting computing device, send an authorization request to the user device for authorization to complete a transaction.

\* \* \* \* \*